(12) United States Patent
Hogervorst

(10) Patent No.: US 10,654,236 B2
(45) Date of Patent: May 19, 2020

(54) BALING PRESS AND METHOD OF PRESSING AND TYING BALES IN A BALING PRESS

(71) Applicant: BOLLEGRAAF PATENTS AND BRANDS B.V., Appingedam (NL)

(72) Inventor: Wouter Hendrik Hogervorst, Hoogeveen (NL)

(73) Assignee: BOLLEGRAAF PATENTS AND BRANDS B.V., Appingedam (NL)

(*) Notice: Subject to any disclaimer, the term of this patent is extended or adjusted under 35 U.S.C. 154(b) by 271 days.

(21) Appl. No.: 15/818,120

(22) Filed: Nov. 20, 2017

(65) Prior Publication Data

US 2018/0141298 A1    May 24, 2018

(30) Foreign Application Priority Data

Nov. 21, 2016 (EP) ..................................... 16199753

(51) Int. Cl.
*B30B 9/30* (2006.01)
*B65B 27/12* (2006.01)
(Continued)

(52) U.S. Cl.
CPC .......... *B30B 9/3014* (2013.01); *A01F 15/042* (2013.01); *A01F 15/14* (2013.01);
(Continued)

(58) Field of Classification Search
CPC .................. A01F 15/146; A01F 15/042; A01F 2015/143; A01F 15/14; B65B 27/12; B65B 13/28; B30B 9/301; B30B 9/3003; B30B 9/3014; B30B 9/3032; B30B 9/3096; B30B 9/3078; B30B 15/0047
(Continued)

(56) References Cited

U.S. PATENT DOCUMENTS 3,084,619 A   8/1963 Tate
3,667,377 A   6/1972 Persson
(Continued)

FOREIGN PATENT DOCUMENTS

DE   2523043 A1   12/1976
DE   2929722 A1    2/1980
(Continued)

*Primary Examiner* — Jimmy T Nguyen
(74) *Attorney, Agent, or Firm* — Pearne & Gordon LLP

(57) ABSTRACT

A baling press with a bale pressing channel, a ram for pressing material in the bale pressing channel, the ram having a pressing face and a slot in the pressing face, a tying assembly on a first side of the bale pressing channel with a loop supply member for forming a loop across the bale pressing channel and movable between an extended position projecting through the slot and a retracted position. The press further has a slot clearing member movable between an extended position projecting through the slot and a retracted position on one side of said bale pressing channel. The slot clearing member and the tying assembly are on opposite sides of a feeding passage. The bale pressing channel is open for discharging cleared material on a side opposite of the location of the slot clearing member in its retracted position. A method of operation is also described.

13 Claims, 7 Drawing Sheets

(51) Int. Cl.
*A01F 15/14* (2006.01)
*B30B 15/00* (2006.01)
*A01F 15/04* (2006.01)
*B65B 13/28* (2006.01)

(52) U.S. Cl.
CPC ............ *B30B 9/301* (2013.01); *B30B 9/3078* (2013.01); *B30B 9/3096* (2013.01); *B30B 15/0047* (2013.01); *B65B 13/28* (2013.01); *B65B 27/12* (2013.01); *A01F 2015/143* (2013.01)

(58) Field of Classification Search
USPC .............................................. 100/3, 19 R, 31
See application file for complete search history.

(56) References Cited

U.S. PATENT DOCUMENTS

| | | | |
|---|---|---|---|
| 4,092,913 A | 6/1978 | Tea | |
| 4,125,068 A * | 11/1978 | Linnerz | B30B 9/3003 100/11 |
| 4,466,345 A * | 8/1984 | Kaldenbach | B65B 27/12 100/19 R |
| 4,604,858 A | 8/1986 | Esau et al. | |
| 5,255,597 A | 10/1993 | Vos | |
| 5,832,815 A * | 11/1998 | Bollegraaf | B30B 9/305 100/42 |
| 7,849,790 B2 * | 12/2010 | Fortier | B30B 9/3021 100/179 |
| 9,402,348 B2 | 8/2016 | Acimas et al. | |
| 2015/0313087 A1 | 11/2015 | Acimas et al. | |

FOREIGN PATENT DOCUMENTS

| | | |
|---|---|---|
| DE | 3036562 A1 | 4/1982 |
| DE | 3939944 A1 | 6/1991 |
| DE | 19508931 A1 | 9/1996 |
| EP | 0190420 A1 | 8/1986 |
| EP | 0492260 A1 | 7/1992 |
| EP | 2425704 A2 | 3/2012 |
| EP | 2941951 A1 | 11/2015 |
| GB | 2034244 A | 6/1980 |

\* cited by examiner

BALING PRESS AND METHOD OF PRESSING AND TYING BALES IN A BALING PRESS

FIELD AND BACKGROUND OF THE INVENTION

The present invention relates to a baling press and to a method of operating a baling press.

To facilitate storage, handling and transportation of loose material, such as waste paper and cardboard, waste plastic, straw, it is usual to press the material into bales.

To prepare the bales, the material is compressed in a baling press. A baling press typically includes a bale pressing channel in which a pressing ram is reciprocally movable to and fro, new material to be baled being added each time after the press has been retracted. The counter pressure against which the bales are pressed is obtained by resistance encountered by the material as it is pressed through the pressing channel, which, to that end, has a cross-section that decreases in downstream direction over at least a portion of its length. Initial counter pressure may be obtained by mounting obstacles in the pressing channel.

For facilitating separation of the pressed material into distinct bales and for keeping the bales together, string material is usually tied around the bales. The string material is for instance wire or rope material. The wire material is for instance steel or plastic wire and the rope material is for instance plastic or natural fiber material that may be twisted or braided and include one or more strands of twisted fiber material. A number of loops of the string extending around the bale is usually obtained by feeding strings from two sources along opposite sides of the bale to be formed, tying the strings together near the downstream end of the bale to be formed and tying together the strings near the upstream end of the bale after the material for forming that bale has been pressed.

Tying together the strings is usually accomplished by twisting or twining end sections of the wire material from a mutually parallel configuration as is for instance described in U.S. Pat. No. 3,667,377 or by tying ends of rope material to each other as is for instance described in European patent application EP 2 941 951.

For passing the string from one side of the bale pressing channel to an opposite tying side where it is to be tied to the string fed from that tying side, loop supply members in the form of rods having a loop supply member at a distal end are provided. An example of such a loop supply member is described in more detail in U.S. Pat. No. 5,255,597. Each time after a bale is pushed out of the pressing chamber, the loop supply members are extended via slots in the pressing ram and passages in walls of the pressing channel, catch the strings at the side opposite the tying side and are retracted to pull the strings over to form a temporary loop projecting until out of the pressing channel. During retracting movement, the loop supply members also entrain the string into temporary loops so that the temporary loops of strings from both sides commonly extend along the loop supply members so that the strings can be tied to each other.

In particular when compressing relatively wet and/or fine material, the slots in the baling press and in the passages in the walls of the pressing channel for allowing the loop supply members to pass through tend to become clogged up, to such an extent that reliable binding of the bales is no longer ensured.

In German patent applications 2 523 043, 3 939 944 and 3 036 562, European patent application 0 492 260, it is proposed to close off the slots in the pressing rams. U.S. Pat. No. 4,604,858 proposes a stationary probe that passes through grooves in the pressing ram when the pressing ram moves to its retracted position. U.S. Pat. No. 4,092,913 proposes that loop supply members push material out of the slots when extended to pick up string material. U.S. Pat. No. 3,084,619 proposes movable closing plates that close off ports in walls of the pressing channel.

SUMMARY OF THE INVENTION

It is an object of the present invention to provide a solution that unclogs at least slots in the pressing ram or passages in the wall of the pressing channel effectively and reliably.

According to the invention, this object is achieved by providing a baling press having:

a bale pressing channel;

a ram reciprocally movable in the bale pressing channel for pressing material in the bale pressing channel, the ram having a pressing face pressing in a pressing direction into the bale pressing channel and at least one slot in the pressing face;

at least one first string feeding structure for feeding first string material along a first feeding path on a first side of the bale pressing channel;

at least one second string feeding structure for feeding second string material along a second feeding path on a second side of the bale pressing channel opposite of the first side of the bale pressing channel;

a tying assembly on the first side of the bale pressing channel, the tying assembly comprising:

a connector for connecting sections of the first string material fed along the first feeding path and of the second string material fed along the second feeding path to each other;

a cutter for cutting off string material from the sections tied to each other; and at least one loop supply member for forming a loop of the second string material across the bale pressing channel to the first side of the bale pressing channel and a loop of the first string material at the first side, the loop supply member having a hook adjacent to a free end for catching the second string material on the second side of the bale pressing channel and for catching the first string material on the first side of the bale pressing channel, and being suspended on the first side of the bale pressing channel and movable between an extended position in which the loop supply member projects through the slot from the first side across the bale pressing channel to the second side of the bale pressing channel and a retracted position on the first side of the bale pressing channel;

a feeding chute communicating with a pressing chamber area of the bale pressing channel via a feed passage forming a downstream end of the feeding chute, the loop supply member being located on a side of said feed passage, being farther in said pressing direction;

a prepress valve which, in closed position, closes off the feed passage from the feeding chute to the bale pressing channel; and a slot clearing assembly having a slot clearing member movable between an extended position in which the slot clearing member projects through the slot and across the bale pressing channel and a retracted position on one side of the bale pressing channel, the feed passage being located on a side of said slot clearing assembly, being farther in said pressing direction.

The bale pressing channel is open for discharging cleared material on a side of the bale pressing channel opposite of a location of the slot clearing member in its retracted position and the invention may also be embodied in a method of pressing and tying bales in a baling press, the baling press comprising:

a bale pressing channel;

a ram reciprocally moving in the bale pressing channel for pressing material in the bale pressing channel, the ram having a pressing face pressing in a pressing direction into the bale pressing channel and at least one slot in the pressing face;

at least one first string feeding structure feeding first string material along a first feeding path on a first side of the bale pressing channel;

at least one second string feeding structure feeding second string material along a second feeding path on a second side of the bale pressing channel opposite of the first side of the bale pressing channel;

a tying assembly on the first side of the bale pressing channel, the tying assembly comprising:

a connector connecting sections of the first string material fed along the first feeding path and of the second string material fed along the second feeding path to each other;

a cutter cutting off string material from the sections tied to each other; and at least one loop supply member forming a loop of the second string material across the bale pressing channel to the first side of the bale pressing channel and a loop of the first string material at the first side, the loop supply member having a hook adjacent to a free end catching the second string material on the second side of the bale pressing channel and catching the first string material on the first side of the bale pressing channel, and being suspended on the first side of the bale pressing channel and moving between an extended position in which the loop supply member projects through the slot from the first side across the bale pressing channel to the second side of the bale pressing channel and a retracted position on the first side of the bale pressing channel;

a feeding chute communicating with a pressing chamber area of the bale pressing channel via a feed passage forming a downstream end of the feeding chute, the loop supply member being located on a side of said feed passage, being farther in said pressing direction;

a prepress valve which, in closed position, closes off the feed passage from the feeding chute to the bale pressing channel; and a slot clearing assembly having a slot clearing member moving between an extended position in which the slot clearing member projects through the slot and across the bale pressing channel and a retracted position on one side of the bale pressing channel, the feed passage being located on a side of said slot clearing assembly, being farther in said pressing direction.

Material cleared from the slot is discharged from the bale pressing channel on a side of the bale pressing channel opposite of the location of the slot clearing member in its retracted position.

When the slot clearing member is moved from its retracted position to its extended position projecting through the slot and across the bale pressing channel, the slot is effectively cleared from material (potentially) clogging up the slot, even if much material has entered the slot and/or the material sticks to an inner surface of the slot, and discharged out of the slot on a side of the pressing channel opposite of the location where the slot clearing member is when it is in its retracted position.

The invention can also be embodied in a baling press having:

a bale pressing channel;

a ram reciprocally movable in the bale pressing channel for pressing material in the bale pressing channel;

at least one first string feeding structure for feeding first string material along a first feeding path on a first side of the bale pressing channel;

at least one second string feeding structure for feeding second string material along a second feeding path on a second side of the bale pressing channel opposite of the first side of the bale pressing channel;

a tying assembly on the first side of the bale pressing channel, the tying assembly comprising:

a tier for tying sections of the first string material fed along the first feeding path and of the second string material fed along the second feeding path to each other;

a cutter for cutting off string material from the sections tied to each other; and at least one loop supply member for forming a loop of the second string material across the bale pressing channel to the first side of the bale pressing channel and a loop of the first string material at the first side, the loop supply member having a hook adjacent to a free end for catching the second string material on the second side of the bale pressing channel and for catching the first string material on the first side of the bale pressing channel, and being suspended on the first side of the bale pressing channel and movable between an extended position in which the loop supply member projects through passages in walls of the bale pressing channel to the second side of the bale pressing channel and a retracted position on the first side of the bale pressing channel; and at least one passage closure movable between an open position for allowing the loop supply member to extend through the passage and a closed position filling up the passage such that an inner surface of the closure is flush with an adjacent inner surface portion of the bale pressing channel.

Since the passage closure in its closed position fills up the passage such that an inner surface of the closure is flush with an adjacent inner surface portion of the bale pressing channel, it is avoided that functionally significant amounts of pressed material enter the passage while the closure closes off the passage and it is ensured that after opening of the closure, the passage is clear to allow the loop supply member to pass through.

Particular elaborations and embodiments of the invention are set forth in the dependent claims.

Further features, effects and details of the invention appear from the detailed description and the drawings.

DETAILED DESCRIPTION

Figure 1:
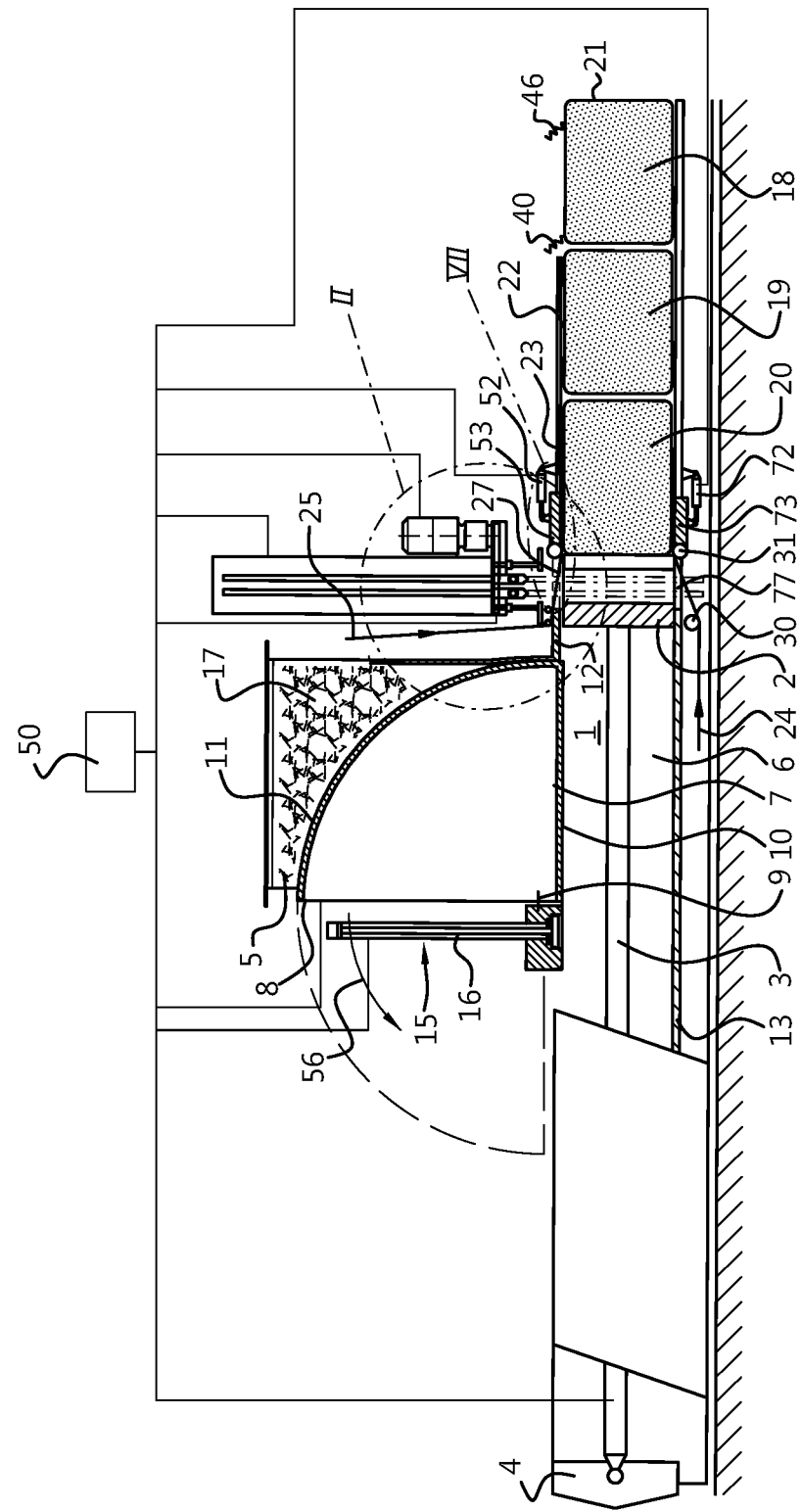
FIG. 1 is a schematic, partially cut-away side view of an example of a baling press according to the invention.
Figure 4:
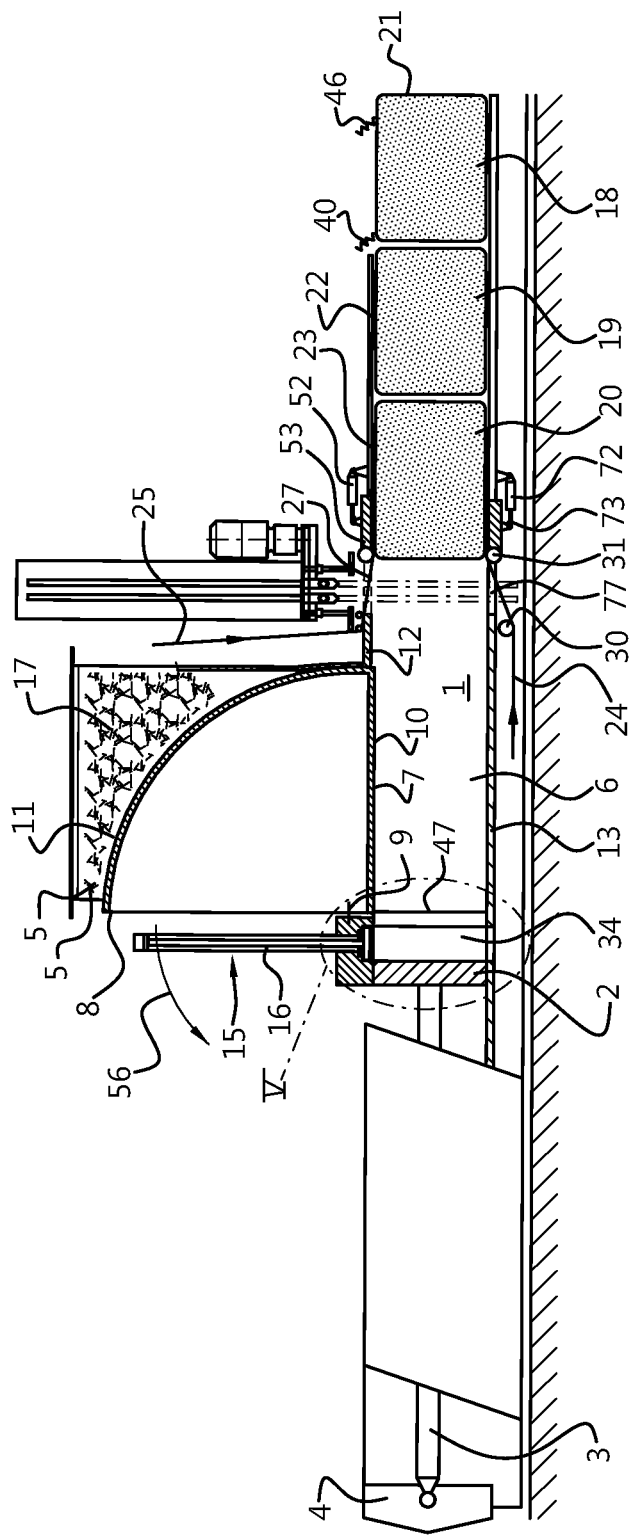
FIG. 4 is a schematic, partially cut-away side view according to FIG. 1 in a further stage of operation.

The baling press shown in FIGS. 1 and 4 has a pressing channel 1 in which a ram 2 is displaceable by a hydraulic cylinder 3 mounted between the ram 2 and a suspension bracket 4. In FIG. 1 the ram 2 is in its most advanced position while in FIG. 4 the ram 2 is in its most retracted position. A feeding chute 5 communicates with a pressing chamber area 6 of the pressing channel 1 via a passage 7 forming a downstream end of the feeding chute 5. The pressing chamber 6 is defined by the stroke volume of a face of the ram 2 facing in pressing direction.

A prepress valve 8 is pivotable about a pivotal axis 9 and has a flat wall 10 which, in the closed position shown, closes off the passage from the feeding chute 5 to the pressing channel 1 and, in opened position, is disposed in a wall of the feeding chute 5. The prepress valve 8 furthermore has a surface 11 substantially curved around the pivotal axis 9, which surface in closed position bounds the feeding chute 5 in axial direction.

Material 17 to be pressed may already be deposited into the feeding chute 5, while the prepress valve 8 is closed. When the prepress valve 8 is opened, all or a portion of the material to be pressed drops into the pressing chamber 6 and may form a pile aside the prepress valve 8. When the prepress valve 8 is closed again, if a pile has formed aside the prepress valve 8, a volume of the material is precompressed in the pressing chamber 6 by the closing of the prepress valve 8. Next, the pressing ram 2 is moved to its most forward position (FIG. 1) compressing the precompressed material while simultaneously new material to be pressed can be deposited into the feeding chute 5.

Depending on the compressibility of the material 17, compressing of a volume of material for forming a bale 18-20 may require several cycles of retracting the ram 2 in a direction opposite to the pressing direction, feeding material with the prepress valve 8 open, closing the prepress valve 8 while optionally prepressing and compressing by advancing the ram in pressing direction. Thus, each bale may be obtained by a single or a plurality of compression cycles of the pressing ram 2 each time compressing material newly fed into the pressing chamber 6.

Counter pressure in the pressing channel 1 against which a bale is pressed in the pressing chamber 6 and pushed out of the pressing chamber 6 is obtained by resistance encountered by the material of previously compressed material formed into bales 18, 19, 20 as it is pressed through the pressing channel 1 while compressed between top and bottom walls 12, 13 and side walls of the pressing channel 1. To that end, the pressing channel 1 may for instance have a cross-section that decreases in downstream direction over at least a portion of its length and/or one or more walls of at least a downstream portion of the pressing channel may resiliently be pressed inwardly. Initial counter pressure may be obtained by mounting obstacles in the pressing channel 1 that are pressed out by the first bale.

For facilitating separation of compressed material into discrete bales and for facilitating manipulation, transport and for preventing bales from falling apart, loops 21, 22 of string material are tied around each bale 18, 19. In FIGS. 1 and 4, a loop 23 around a most recently compressed bale 20 has not yet been completed. The string material may for instance be wire or rope material. The wire material is for instance steel or plastic wire and the rope material is for instance plastic or natural fiber material that may be twisted or braided and include one or more strands of twisted fiber material. In the present example, the string material is wire material that is tied by twisting. However, other string material and other manners of connecting, such as knotting, welding or use of fasteners, can also be applied.

Figure 3:
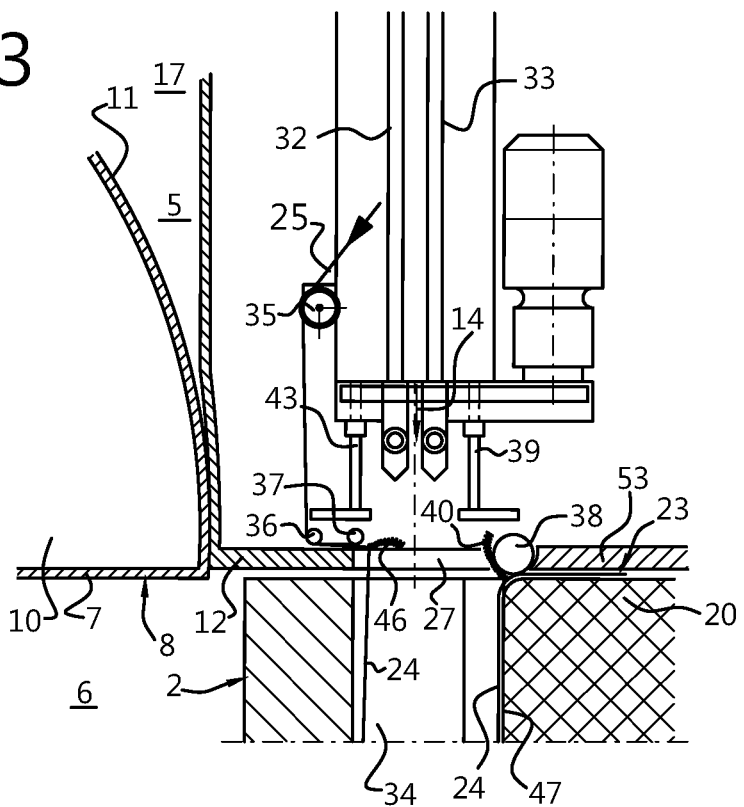
FIG. 3 is a schematic, partially cut-away side view of the portion II of the baling press shown in FIG. 1 in a further stage of operation.

For tying one or more loops of wire material around each bale, one or more (in this example five) lower wires 24 are fed under pressing channel 1. From above, the same number of wires 25 is fed. Before a bale is formed, each first wire 24 fed from below has been tied, by means of a twist 46, to an upper wire 26 fed from above during the tying of a previous bale (see also FIG. 3).

Figure 2:
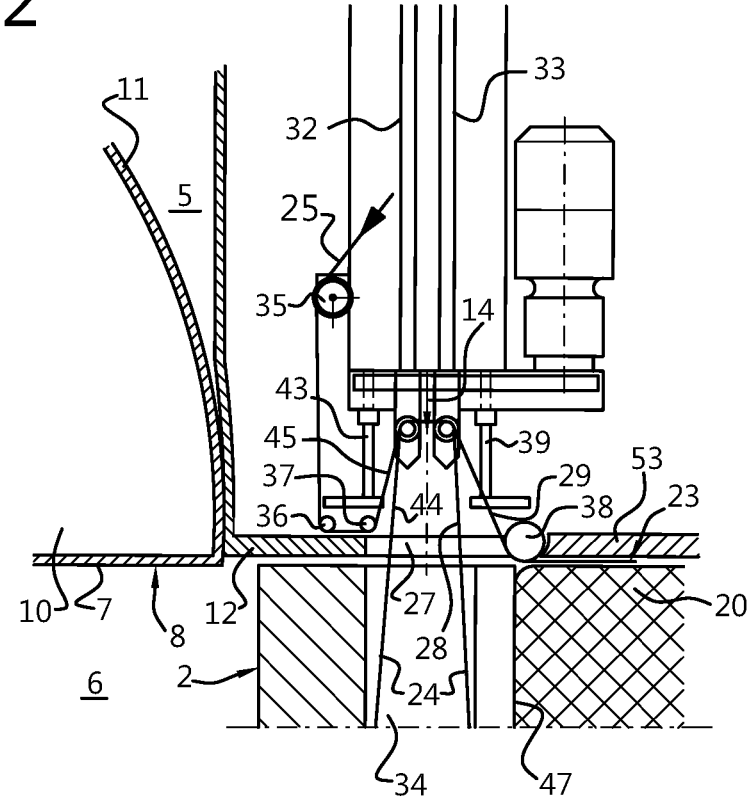
FIG. 2 is a schematic, partially cut-away side view of a portion II of the baling press shown in FIG. 1.

A tying assembly is provided for arranging a loop 21-23 of wire material 24, 25 around a bale and for holding a pair of end portions 28, 29 (see FIG. 2) of the loop 23 next to each other. According to the present example, the tying assembly includes lower guide rollers 30, 31 located closely along the bottom of the pressing channel 1, for guiding lower wires 24 fed from respective spools (not shown) into the pressing channel 1 and loop supply members 32, 33 for pulling up lower wires 24 from adjacent to the bottom of the bale pressing channel 1. The loop supply members 32, 33 are in the form of rods reciprocally movable in longitudinal direction of the rods and are suspended in positions on a first, upper side of the bale pressing channel 1 and in pressing direction of the feed passage 7 and each have a hook adjacent to a free end for catching the lower wires 24 on a second, lower side of the bale pressing channel 1 and for catching the upper wire on the upper side of the bale pressing channel 1. An example of such a loop supply member is described in more detail in U.S. Pat. No. 5,255, 597. The loop supply members 32, 33 are movable between an extended, lowermost position as indicated by dash and dot lines in FIGS. 1 and 4 and a retracted, uppermost position as shown in full lines in FIGS. 1, 2, 3 and 4. In the retracted position, the loop supply members 32, 33 are on the upper side of the bale pressing channel. Each time after a bale is pushed out of the pressing chamber 6, the loop supply members 32, 33 are extended through passages 27 in an upper wall 12 of the pressing channel 1 and through slots 34 in the pressing ram 3, catch the lower wires 24 that extend closely along the bottom of the pressing channel 1 and pull up loops of the wires 24 to form temporary loops projecting above the pressing channel 1. During a last portion of the upward movement, the loop supply members 32, 33 also catch and entrain the upper wires 25 into temporary loops so that the temporary loops of upper and lower wire material 24, 25 commonly extend along the loop supply members 32, 33 as is shown in FIG. 2.

While in the present example, the first side is the upper side of the bale pressing channel and the second side is the lower side of the bale pressing channel, the first and second sides may also be opposite lateral sides of the bale pressing channel or upper and lower sides may be reversed.

The tying assembly furthermore includes upper guide rollers 35, 36, 37, 38 at the top side end of the pressing channel 1, for guiding upper wires 25 fed from respective spools into the pressing channel 1 and to the area where the temporary loops are formed.

For connecting end portions 28, 29 of the loops of wires 24, 25 near the bale 20 to each other, connectors in the form of twisters 39 are arranged for engaging the pairs of end portions 28, 29 near the bale and moving an engaged section of at least one of each of the pairs of end portions 28, 29 (see FIG. 2) about a longitudinal axis of the other such that the pairs of end portions 28, 29 are twisted into wire twists 40 (see FIG. 3) between the twisters 39 and the respective portions of the loops 23 extending about the bale 20.

Furthermore, a second set of connectors in the form of twisters 43 is provided for engaging pairs of end portions 44, 45 of the wires 24, 25 extending to the twisters 43 from the respective supply spools and moving engaged sections of the end portions 44, 45 about longitudinal axes of the other section of each pair such that the end portions 44, 45 are also twisted into wire twists 46 (see FIG. 3) between the twisters 43 and more remote sections of the upper and lower wires 24, 25. These twists 46 connect the respective upper and lower wires 24, 25 to each other, such that when a new bale is pressed out of the pressing chamber 6, the upper and lower wires 24, 25 are pulled around the bale and form the downstream portions of the new loops being formed around that bale.

After the twists 40, 46 have at least partially been made, the wires 24, 25 are cut between the respective loop supply members 32, 33 by a cutter 14. After cutting, the twisters 39, 43 may be rotated further if the twists 40, 46 had not been completed previously.

A slot clearing assembly 15 is located such that the feed passage 5 is located in the pressing direction of the slot clearing assembly 15, i.e. on a side of the feeding chute 5 opposite of the loop supply members 32, 33. The slot clearing assembly 15 has slot clearing members 16 movable between extended positions in which the slot clearing members 16' project through the slots 34 in a pressing face 47 of the pressing ram 2 and across the bale pressing channel 1 and a retracted position on the first, upper side of the bale pressing channel 1. The bale pressing channel 1 is open for discharging cleared material 48 on a second, lower side of the bale pressing channel 1 opposite of the location of the slot clearing member 16 in its retracted position.

In operation, the slot clearing member 16 moves between the extended position and the retracted position and material 48 cleared from the slot 34 is discharged from the bale pressing channel 1 on the lower side opposite of the location of the slot clearing member 16 when it is in its retracted position.

When the slot clearing member 16 is moved from its retracted position to its extended position projecting through the slot 34 and across the bale pressing channel 1, the slot 34 is effectively cleared from material 49 (potentially) clogging up the slot 34, even if much material has entered the slot 34 and/or the material 49 sticks to an inner surface of the slot 34, and discharged out of the slot 34 on a second, lower side of the pressing channel 1 opposite of the first, upper side where the slot clearing member 16 is located when it is in its retracted position.

The baling press further has a control unit 50 (see FIG. 1) arranged for controlling the pressing hydraulic cylinder 3 driving the pressing ram 2, an actuator of the prepress valve 8, an actuator of the slot clearing assembly, an actuator of the loop supply members 32, 33, a drive 51 of the twisters 39, 43, an actuator of the cutter 14 and actuators 52, 72 of closures 53 (see FIGS. 7 and 8) and 73. The control unit 50 is arranged such that, prior to tying of a bale: the pressing ram 2 is retracted until the slot 34 is in alignment with the slot clearing member 16, subsequently the slot clearing member 16 is extended through the slot 34, subsequently the slot clearing member 16 is retracted out of the slot 34, subsequently the pressing ram 2 is advanced against the completed bale, subsequently the loop supply members 32, 33 are extended through the slots 34, subsequently the loop supply members 32, 33 are retracted out of the slot 34 and subsequently the upper and lower wires are connected by operating the twisters 39, 43. This allows the slot clearing assembly 15 to be arranged on a side of the feeding chute 5 opposite of the side where the tying assembly is located. Thus, no space needs to be reserved between the chute 5 and the tying assembly even if the slot clearing assembly is mounted on top of the bale pressing channel 1. Moreover retraction of the ram 3 prior to clearing of the slots 34 to a side of the feeding chute 5 opposite of the location of the tying assembly can be carried out accurately and quickly, because the ram can be retracted to a hard stop defining the most retracted position of the ram 3.

In the present example wire guiding rollers 31 and 38 are mounted to the closure 73 and, respectively 53. It is however also possible to rotatably suspend the guiding rollers otherwise, e.g. from the wall of the pressing channel or on a carrier that alternatingly moves the respective guiding roller out of the respective passage if that passage is closed and into the passage if that passage is opened.

Preferably, the stroke after clearing of the slots 34 is a last stroke prior to the next passing of the loop supply members 32, 33 through the slots 34. Thus, it is avoided that the slots 34 become soiled and/or clogged-up again prior to passing the loop supply members 32, 33 through the slots 34.

This last stroke prior to tying may involve compression of further material 17 fed via the passage 7 or the prepress valve 8 may be left closed during retraction of the pressing ram 3 until the last stroke prior to extending the loop supply members 32, 33 through the slots 34, so that no further material is compressed during the last stroke prior to binding and any compression that occurs does at most involve recompression of previously compressed material that has sprung back to some extent during and after retraction of the pressing ram 3. This is advantageous for obtaining a compactly compressed trailing end of a bale and further reduces soiled and/or clogging-up of the slots 34 prior to tying after the slots 34 have been cleared.

Figure 5:
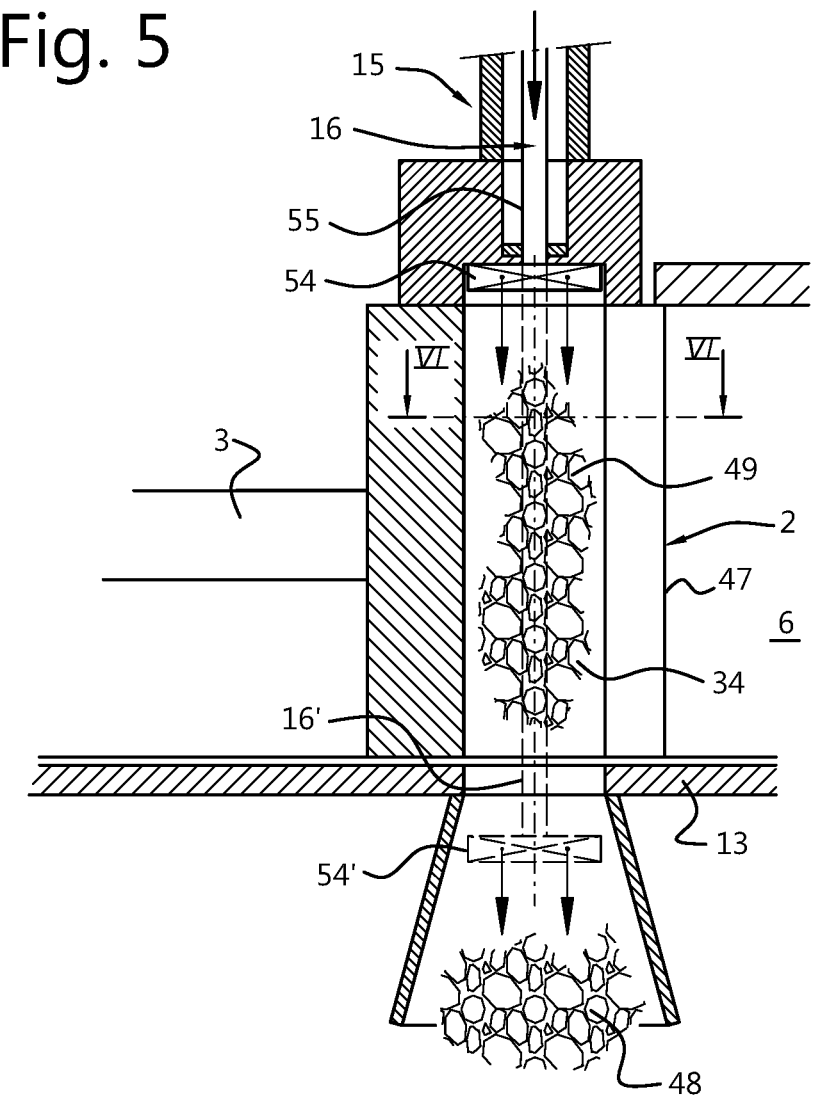
FIG. 5 is a schematic, partially cut-away side view of a portion V in FIG. 4.
Figure 6:
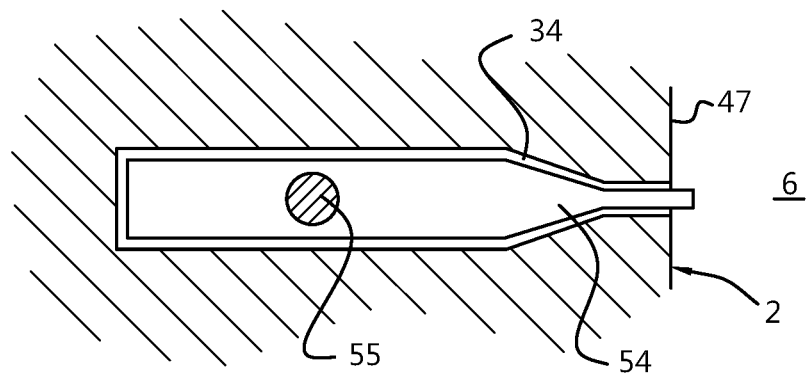
FIG. 6 is a schematic, cross-sectional view along plane VI-VI in FIG. 5, a slot clearing member being in extended position.

As is best seen in FIGS. 5 and 6, the slot clearing members 16 have slot scrapers 54 at distal ends thereof. The slot scrapers 54 each have a contour extending closely inside a cross-section of at least a portion of the respective slot 34. Thus, the slots 34 can be cleared from material penetrated therein very effectively. The slot scrapers 54 each project slightly in pressing direction of the face 47 of the ram 3 facing in the pressing direction, so that material 48 is removed from the slots 34 effectively. Since the slot clearing assembly 15 is arranged on a side of the chute 5 opposite of the trailing end of the bale 20 to be tied and clearing is performed when the ram 3 is in retracted position with the slots aligned with the slot clearing members 16, the slot scrapers 54 projecting from the slots 34 in pressing direction can move back and forth without interfering with a bale in contact with the ram 3.

The slot scrapers 54 (54' if the slot clearing member 16 is in extended position) are each mounted to a bar 55 extending in the respective slot 34 when the slot clearing member 16 is in its extended position. The bar 55 is retracted to a position longitudinally in line with its extended position when it is in its retracted position. Thus, a simple construction for reciprocally extending and retracting the slot clearing member 16 is provided, by which relatively large pushing forces can be exerted for instance with a pneumatic, hydraulic or electrically driven actuator. However, other solutions for pushing the slot scraper into the slot and retracting the slot scraper may also be provided, such as pushing belt that is to some extent flexible when not loaded by a pushing force or a pneumatic drive combined with a closure of the slot in pressing direction trailing the slot scraper.

The slot clearing member 15 in its retracted position is at a top side of the bale pressing channel 1, so that it does not increase the footprint of the bling press.

The prepress valve 8 is pivotably mounted and pivots out of the feeding chute 5 in a sense of rotation 56 generally opposite to the pressing sense of rotation. Although the slot clearing assembly 15 is mounted closely adjacent to the prepress valve 8 in a direction 56 generally opposite to the pressing direction, it is not in the way of pivoting movement of the prepress valve 8, because the prepress valve 8 is hollow and open on its side facing the slot clearing assembly 15 when the prepress valve 8 is closed and a hollow internal space of the prepress valve 8 has a radius extending radially outside of the slot clearing assembly 15, so that at least a portion of the prepress valve is in a hollow space inside the prepress valve when the prepress valve is open. This principle may also be applied to a prepress valve that opens and closes along a different path of movement, such as in a horizontal direction.

Figure 7:
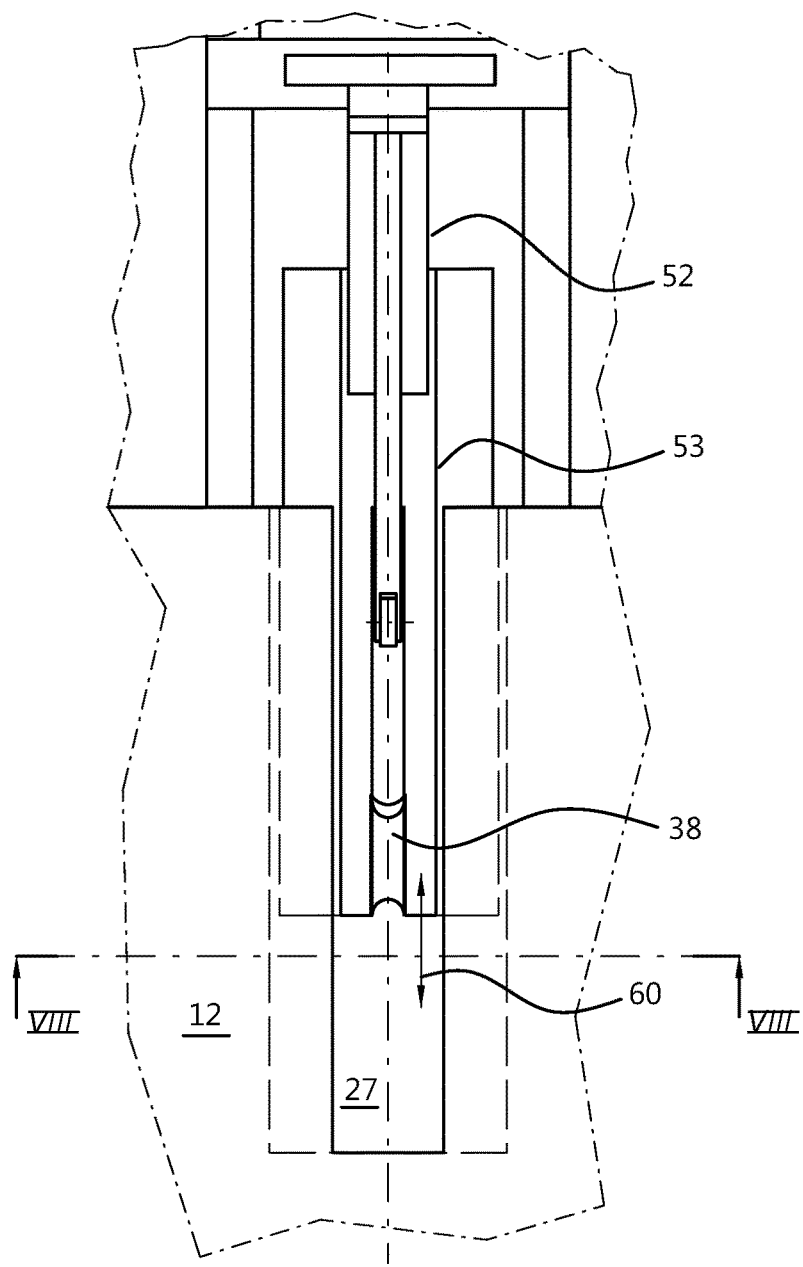
FIG. 7 is a schematic top plan view of a portion VII shown in FIG. 1.
Figure 8:
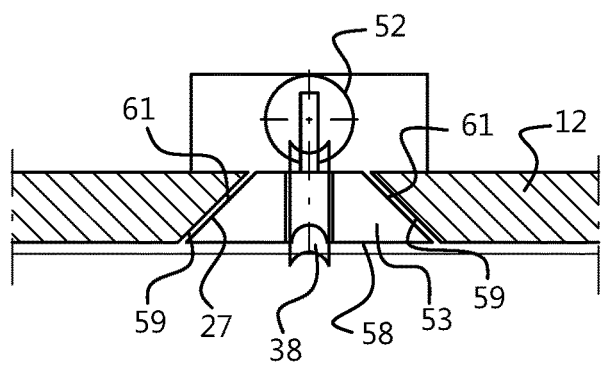
FIG. 8 is a schematic cross-sectional view along a plane VIII-VIII in FIG. 7.
Figure 9:
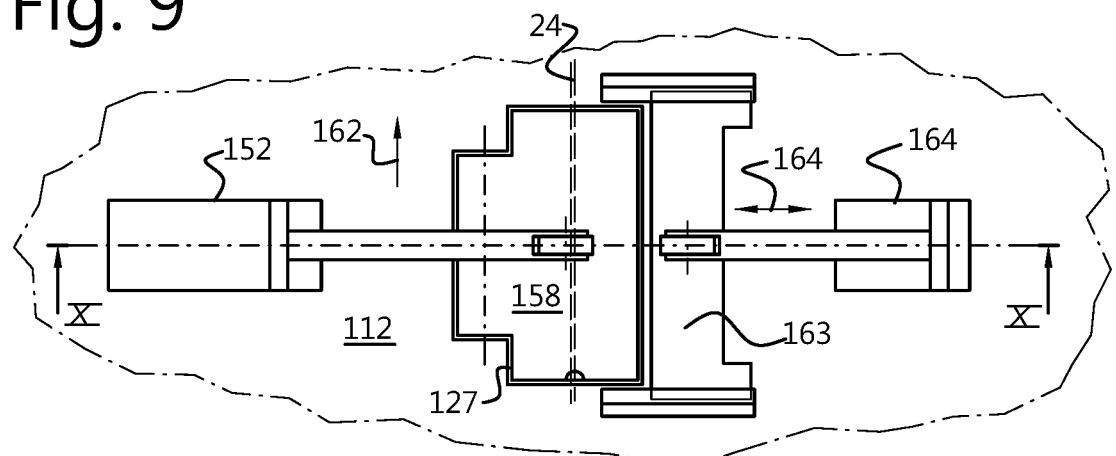
FIG. 9 is a schematic top plan view according to FIG. 7 of an alternative example of a baling press according to the invention.
Figure 10A:
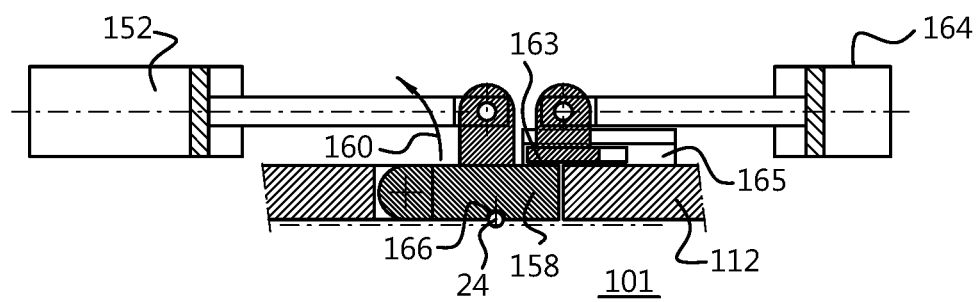
FIGS. 10A-10C are schematic cross-sectional views along a plane X-X in FIG. 9, FIGS. 10A and 10C showing different stages of operation than the stage shown in FIGS. 9 and 10B.
Figure 10B:
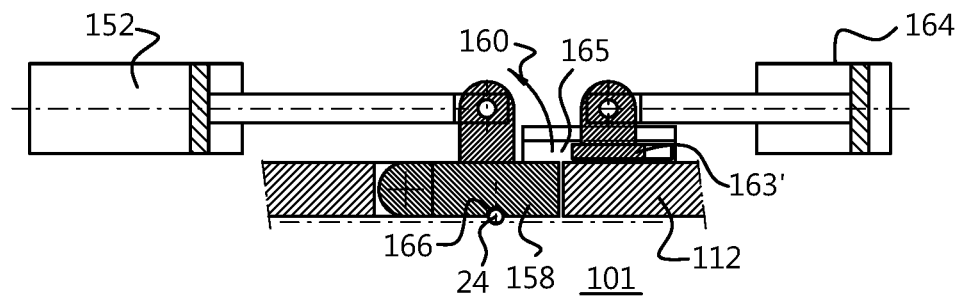
Figure 10C:
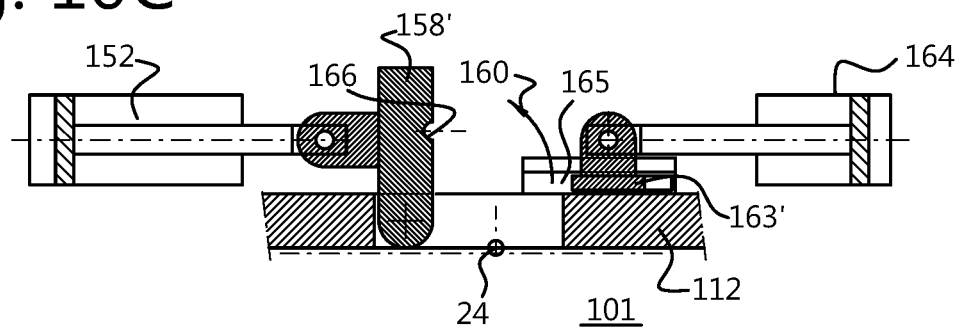

Passages 27, 77 are provided in the top wall 12 and, respectively, bottom wall 13 of the pressing channel. The loop supply members 32, 33 can be extended and retracted through the passages 27, 77. As is best seen in FIGS. 7 and 8, the closure 53 for closing off one of the passages 27 is movable between an open position for allowing at least one loop supply member 32, 33 to extend through said passage 27 and a closed position filling up the passage such that an inner surface 58 of the closure 53 is flush with an adjacent inner surface portion 59 of the bale pressing channel 1. Thus, it is avoided that during pressing the passages 27 are filled up with compressed material 17, so that the loop supply members 32, 33 cannot be extended through the passage reliably.

To avoid that the closure 53 is pressed out of the pressing channel wall 12 during compression of a bale 18-20, the passage 27 has passage side walls 59 that are oriented in longitudinal directions 60 of the bale pressing channel 1, while at least sections of the side walls 59 converging outwardly of the bale pressing channel 1 and the closure 58 has closure sidewalls 61 also oriented in longitudinal directions 60 of the bale pressing channel 1. At least sections of the closure side walls 61 converge outwardly of the bale pressing channel 1. The converging side wall sections 59, 61 of the passages 27 and of the closure 58 mutually engage for retaining the closure 58 against outward movement when in closed position against outwardly oriented compression forces exerted by the material being baled.

The closure 73 and actuator 72 for closing-off and leaving open the passage 77 in the bottom wall 13 are of a similar design as the closure 53 and actuator 52 for closing-off and leaving open the passage 27 in the top wall 12 of the pressing channel 1.

In the baling press according to the present example, the string material 24, 25 is supplied from the bottom and the top of the pressing channel 1 and the tying assembly with the loop supply members (when retracted) and the slot clearing assembly are both arranged on top of the pressing channel 1. It is however also possible to provide that the tying assembly with the loop supply members (when retracted) and the slot clearing assembly are both arranged on a bottom side of the pressing channel.

In FIGS. 9 and 10A-10C, an alternative passage 127 for allowing the loop supply members 32, 33 to be extended through a wall 112 of the bale pressing channel 101 is shown. The closure 158 is movable from a closed position 158 (FIGS. 9, 10A, 10B), in which a wire 24 runs through a slot 166 in an inner surface of the closure 158, to an open position 158' in an opening direction 160 transverse to a longitudinal pressing direction 162 of the bale pressing channel 101. When the closure is closed, an inner surface of the closure 158 is flush with adjacent inner surface portions of the wall 112 of the bale pressing channel 101, so that no significant steps are formed in the surface bounding the bale pressing channel 101. A locking member 163 is guided by a guide track 165 for movement only in directions 164 generally transverse to the opening direction 160 and movable between a locking position 163 (FIG. 10A) locking the closure 158 in the closed position 158 and a releasing position 163' (FIGS. 9, 10B and 10C) allowing opening of the closure from the closed position 158 and closing the closure from the opened position 158' into the closed position 158. The locking member 163 in the locked position reliably prevents the closing member 158 from being pressed open by compression forces exerted by material in the pressing channel 101. This allows actuators 152, 164 for opening and closing the closure 158 and for moving the locking member between the locking and releasing positions to be dimensioned lightly. If a plurality of passages 127 in a row is to be closed off simultaneously. Each actuator is preferably coupled to a plurality of closures or locking members for simultaneous operation of the closures and locking members for closing off that row of passages.

Figure 11:
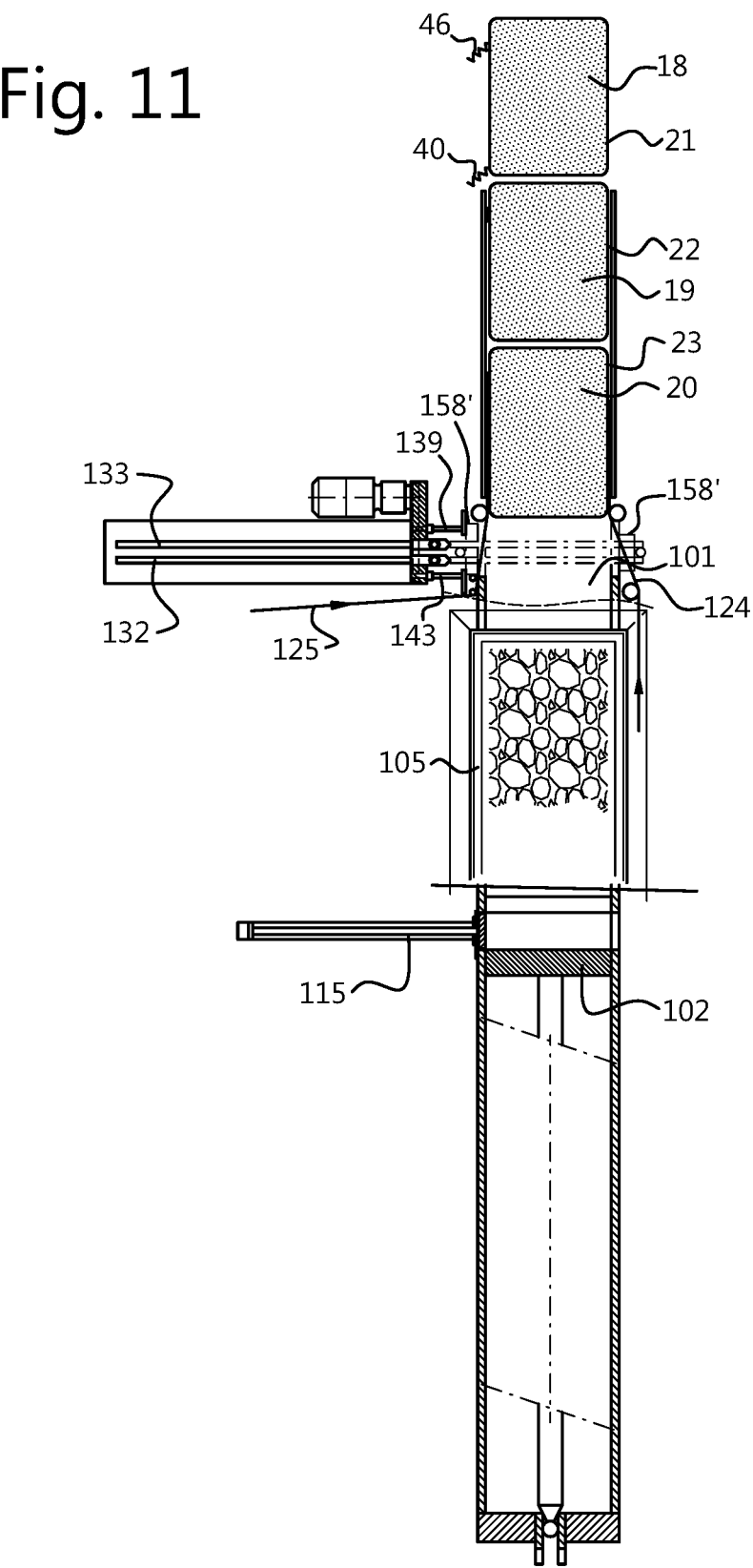
FIG. 11 is a schematic, partially cut-away top plan view of a further example of a baling press according to the invention.

In FIG. 11 a further example of a baling press according to the invention is shown. In this press, bales 18-20 around which loops 21-23 of string material including connections 40, 46 are tied as in the baling press according to the previous example, except that the loops 21-23 extend in a horizontal plane. In this press, the string material 124, 125 is supplied generally horizontally from opposite lateral sides of the pressing channel 101. The tying assembly with loop supply members 132, 133 (when retracted) and twisters 139, 143 as well as the slot clearing assembly 115 are both arranged on the same lateral side of the pressing channel 101 and accordingly, the slots in the pressing face of the ram 102, through which the loop supply members 132, 133 are passed are then oriented horizontally. Material cleared from the slots is expelled to a side of the pressing channel 101 opposite of the slot clearing assembly 115. Arranging the tying assembly and the slot clearing assembly on opposite sides is also possible but generally less practical since this results in a footprint with a higher overall width and will therefore be more advantageous in situations with a particular factory lay-out only.

Passages in the walls of the pressing channel 101 for allowing the loop supply members 132, 133 to pass through can be closed with closures 158 as shown in FIGS. 9 and 10A-10C.

In this example, the tying assembly and the slot clearing assembly 115 are arranged on opposite sides of the feeding chute 105. However, if the slot clearing assembly is arranged to a lateral side of the pressing channel, the slot clearing members may also be arranged to pass through a section of the pressing channel under the feeding chute. This allows the retraction immediately prior to clearing of the slots and the stroke immediately after clearing of the slots to be relatively short.

Several features have been described as part of the same or separate embodiments. However, it will be appreciated that the scope of the invention also includes embodiments having combinations of all or some of these features other than the specific combinations of features embodied in the examples.

The invention claimed is:

1. A baling press comprising:
   a bale pressing channel;
   a ram reciprocally movable in the bale pressing channel for pressing material in the bale pressing channel, said ram having a pressing face pressing in a pressing direction into said bale pressing channel and at least one slot in said pressing face;
   at least one first string feeding structure for feeding first string material along a first feeding path on a first side of the bale pressing channel;
   at least one second string feeding structure for feeding second string material along a second feeding path on a second side of the bale pressing channel opposite of said first side of the bale pressing channel;
   a tying assembly on said first side of the bale pressing channel, said tying assembly comprising:
      a connector for connecting sections of the first string material fed along said first feeding path and of the second string material fed along said second feeding path to each other;
      a cutter for cutting off string material from said sections tied to each other; and
      at least one loop supply member for forming a loop of the second string material across the bale pressing channel to said first side of said bale pressing channel and a loop of the first string material at said first side, said loop supply member having a hook adjacent to a free end for catching said second string material on said second side of said bale pressing channel and for catching said first string material on said first side of said bale pressing channel, and being suspended on said first side of said bale pressing channel and movable between an extended position in which the loop supply member projects through said slot from said first side across said bale pressing channel to said second side of said bale pressing channel and a retracted position on said first side of said bale pressing channel;
   a feeding chute communicating with a pressing chamber area of the bale pressing channel via a feed passage forming a downstream end of the feeding chute, said loop supply member being located on a side of said feed passage; being downstream in said pressing direction from said feed passage;
   a prepress valve which, in closed position, closes off the feed passage from the feeding chute to the bale pressing channel; and
   a slot clearing assembly having a slot clearing member movable between an extended position in which the slot clearing member projects through said slot and across said bale pressing channel and a retracted position on one side of said bale pressing channel, said feed passage being located on a side of said slot clearing assembly, being downstream in said pressing direction from said slot clearing assembly;
   wherein said bale pressing channel is open for discharging cleared material on a side of the bale pressing channel opposite of a location of the slot clearing member in its retracted position.

2. The baling press according to claim 1, further comprising a control unit for controlling movements of said pressing ram, said tying assembly and said slot clearing assembly, wherein said control unit is arranged for, prior to tying of a bale, causing said pressing ram to be retracted until said slot is in alignment with said slot clearing member, subsequently extending said slot clearing member through said slot, subsequently retracting said slot clearing member out of said slot, subsequently advancing said pressing ram against said completed bale, subsequently extending said loop supply member through said slot, subsequently retracting said loop supply member and subsequently connecting sections of the first string material fed along said first feeding path and of the second string material fed along said second feeding path to each other.

3. The baling press according to claim 1, wherein said slot clearing member has a slot scraper at a distal end, said slot scraper having a contour extending closely inside a cross-section of at least a portion of said slot.

4. The baling press according to claim 1, wherein said slot clearing member has a slot scraper and a bar extending in said slot when the slot clearing member is in said extended position and being retracted to a position longitudinally in line with said extended position when in said retracted position.

5. The baling press according to claim 1, wherein said slot clearing member in said retracted position is at a top side of said bale pressing channel.

6. The baling press according to claim 5, wherein the prepress valve is hollow and open on its side facing the slot clearing assembly when the prepress valve is closed and wherein at least a portion of the prepress valve is in a hollow space inside the prepress valve when the prepress valve is open.

7. A baling press comprising:
   a bale pressing channel;
   a ram reciprocally movable in the bale pressing channel for pressing material in the bale pressing channel;
   at least one first string feeding structure for feeding first string material along a first feeding path on a first side of the bale pressing channel;
   at least one second string feeding structure for feeding second string material along a second feeding path on a second side of the bale pressing channel opposite of said first side of the bale pressing channel;
   a tying assembly on said first side of the bale pressing channel, said tying assembly comprising:
      a tier for tying sections of the first string material fed along said first feeding path and of the second string material fed along said second feeding path to each other;

a cutter for cutting off string material from said sections tied to each other; and at least one loop supply member for forming a loop of the second string material across the bale pressing channel to said first side of said bale pressing channel and a loop of the first string material at said first side, said loop supply member having a hook adjacent to a free end for catching said second string material on said second side of said bale pressing channel and for catching said first string material on said first side of said bale pressing channel, and being suspended on said first side of said bale pressing channel and movable between an extended position in which the loop supply member projects through passages in walls of said bale pressing channel to said second side of said bale pressing channel and a retracted position on said first side of said bale pressing channel; and at least one passage closure movable between an open position for allowing said loop supply member to extend through said passage and a closed position filling up said passage such that an inner surface of said closure is flush with an adjacent inner surface portion of said bale pressing channel;

wherein the at least one passage has passage side walls oriented in longitudinal direction of said bale pressing channel, at least a section of said passage side wall converging outwardly of said bale pressing channel, and wherein said closure has closure side walls oriented in longitudinal direction of said bale pressing channel, at least a section of said closure side wall converging outwardly of said bale pressing channel, said converging section of said passage side wall and said converging section of said closure side wall mutually engaging for retaining said closure against outward movement when in closed position.

8. A baling press comprising:

a bale pressing channel;

a ram reciprocally movable in the bale pressing channel for pressing material in the bale pressing channel;

at least one first string feeding structure for feeding first string material along a first feeding path on a first side of the bale pressing channel;

at least one second string feeding structure for feeding second string material along a second feeding path on a second side of the bale pressing channel opposite of said first side of the bale pressing channel;

a tying assembly on said first side of the bale pressing channel, said tying assembly comprising:

a tier for tying sections of the first string material fed along said first feeding path and of the second string material fed along said second feeding path to each other;

a cutter for cutting off string material from said sections tied to each other; and at least one loop supply member for forming a loop of the second string material across the bale pressing channel to said first side of said bale pressing channel and a loop of the first string material at said first side, said loop supply member having a hook adjacent to a free end for catching said second string material on said second side of said bale pressing channel and for catching said first string material on said first side of said bale pressing channel, and being suspended on said first side of said bale pressing channel and movable between an extended position in which the loop supply member projects through passages in walls of said bale pressing channel to said second side of said bale pressing channel and a retracted position on said first side of said bale pressing channel; and at least one passage closure movable between an open position for allowing said loop supply member to extend through said passage and a closed position filling up said passage such that an inner surface of said closure is flush with an adjacent inner surface portion of said bale pressing channel;

wherein the closure is movable from a closed position to an open position in an opening direction transverse to a longitudinal pressing direction of said bale pressing channel, further comprising a locking member guided for movement in directions generally transverse to said opening direction only and movable between a locking position locking said closure in said closed position and a releasing position allowing opening of said closure from said closed position.

9. The baling press according to claim 1, wherein the loop supply member is in the form of a rod reciprocally movable in longitudinal direction of said rod.

10. A method of pressing and tying bales in a baling press, the baling press comprising:

a bale pressing channel;

a ram reciprocally moving in the bale pressing channel for pressing material in the bale pressing channel, said ram having a pressing face pressing in a pressing direction into said bale pressing channel and at least one slot in said pressing face;

at least one first string feeding structure feeding first string material along a first feeding path on a first side of the bale pressing channel;

at least one second string feeding structure feeding second string material along a second feeding path on a second side of the bale pressing channel opposite of said first side of the bale pressing channel;

a tying assembly on said first side of the bale pressing channel, said tying assembly comprising:

a connector connecting sections of the first string material fed along said first feeding path and of the second string material fed along said second feeding path to each other;

a cutter cutting off string material from said sections tied to each other; and at least one loop supply member forming a loop of the second string material across the bale pressing channel to said first side of said bale pressing channel and a loop of the first string material at said first side, said loop supply member having a hook adjacent to a free end catching said second string material on said second side of said bale pressing channel and catching said first string material on said first side of said bale pressing channel, and being suspended on said first side of said bale pressing channel and moving between an extended position in which the loop supply member projects through said slot from said first side across said bale pressing channel to said second side of said bale pressing channel and a retracted position on said first side of said bale pressing channel;

a feeding chute communicating with a pressing chamber area of the bale pressing channel via a feed passage forming a downstream end of the feeding chute, said loop supply member being located on a side of said feed passage, being downstream in said pressing direction from said feed passage;

a prepress valve which, in closed position, closes off the feed passage from the feeding chute to the bale pressing channel; and a slot clearing assembly having a slot clearing member moving between an extended position in which the slot clearing member projects through said slot and across said bale pressing channel and a retracted position on one side of said bale pressing channel, said feed passage being located on a side of said slot clearing assembly, being downstream in said pressing direction from said slot clearing assembly;

wherein material cleared from said slot is discharged from the bale pressing channel on a side of the bale pressing channel opposite of a location of the slot clearing member in its retracted position.

11. The method according to claim 10, further comprising prior to tying of a bale:

retracting said pressing ram until said slot is in alignment with said slot clearing member, subsequently extending said slot clearing member through said slot, subsequently retracting said slot clearing member out of said slot, subsequently advancing said pressing ram against said completed bale, subsequently extending said loop supply member through said slot, subsequently retracting said loop supply member and subsequently connecting sections of the first string material fed along said first feeding path and of the second string material fed along said second feeding path to each other.

12. The method according to claim 11, wherein, after extending said slot clearing member through said slot, the pressing ram performs only a single stroke in pressing direction prior to passing of the loop supply member through said slot.

13. The method according to claim 12, further comprising retracting the pressing ram and performing said single stroke prior to tying with the prepress valve closed.

* * * * *